(12) United States Patent
Barnes (10) Patent No.: US 8,332,184 B2
(45) Date of Patent: Dec. 11, 2012

(54) GRAVITY SURVEY DATA PROCESSING

(75) Inventor: Gary Barnes, Cambridgeshire (GB)

(73) Assignee: Arkex Limited, Cambridge (GB)

( * ) Notice: Subject to any disclaimer, the term of this patent is extended or adjusted under 35 U.S.C. 154(b) by 338 days.

(21) Appl. No.: 12/311,750

(22) PCT Filed: Jan. 30, 2008

(86) PCT No.: PCT/GB2008/050059
§ 371 (c)(1),
(2), (4) Date: Jun. 15, 2009

(87) PCT Pub. No.: WO2008/093139
PCT Pub. Date: Aug. 7, 2008

(65) Prior Publication Data
US 2009/0287464 A1 Nov. 19, 2009

(30) Foreign Application Priority Data
Jan. 30, 2007 (GB) .................................. 0701725.4

(51) Int. Cl.
*G01V 3/38* (2006.01)
*G06F 17/10* (2006.01)
(52) U.S. Cl. .................. 702/189; 702/5; 702/65; 703/2; 703/5
(58) Field of Classification Search .................. 702/189, 702/5, 65
See application file for complete search history.

(56) References Cited

U.S. PATENT DOCUMENTS

| | | | |
|---|---|---|---|
| 5,673,191 A | 9/1997 | Chapin et al. | |
| 5,886,255 A * | 3/1999 | Aronstam .................. | 73/152.01 |
| 2003/0060981 A1 * | 3/2003 | Routh et al. ..................... | 702/14 |
| 2004/0172199 A1 * | 9/2004 | Chavarria et al. ............... | 702/14 |
| 2005/0197773 A1 | 9/2005 | Brewster et al. | |
| 2006/0004519 A1 | 1/2006 | Humphrey et al. | |
| 2009/0216451 A1 * | 8/2009 | Barnes et al. ..................... | 702/5 |

FOREIGN PATENT DOCUMENTS

| | | |
|---|---|---|
| DE | 102004005676 | 8/2005 |
| GB | 2 435 523 A | 1/2006 |
| RU | 2091820 C1 | 9/1997 |
| WO | WO 03/023452 A1 | 3/2003 |
| WO | WO 2005/088346 A1 | 9/2005 |
| WO | WO 2007/012895 A2 | 2/2007 |

OTHER PUBLICATIONS

Translation of DE102004005676, Aug. 25, 2005.*
Translation of RU2091820, Sep. 27, 1997.*
L. Lacoste, "Crosscorrelation Method for Evaluating and Correcting Shipboard Gravity Data," Geophysics, vol. 18:4, Aug. 1973, pp. 701-709, XP-002517646.

(Continued)

*Primary Examiner* — Hal Wachsman
(74) *Attorney, Agent, or Firm* — Foley & Lardner LLP (57) ABSTRACT

This invention relates to techniques for processing potential field measurement data from airborne surveys such as gravity surveys, and to methods, apparatus and computer program code for such techniques. The method comprises: inputting measured potential field data comprising data defining a plurality of potential field measurements each with an associated measurement position and measurement time; and determining a set of field mapping parameters using a model comprising a combination of a spatial part representing a spatial variation of a potential field and a temporal part representing time domain noise in the measured potential field data.

24 Claims, 4 Drawing Sheets

OTHER PUBLICATIONS

Blakely, Richard J.; Chapter 9—Forward Method; Potential Theory in Gravity & Magnetic Applications; Sep. 13, 1996; pp. 182-213; Cambridge University Press; UK.

Office Action issued in RU Application No. 2009132490/28(045610) with English translation, Dec. 28, 2011, 16 pages.

Torta, J.M., et al., A model of the secular change of the geomagnetic field for Antarctica, Tectonophysics 347, 2002; pp. 179-187; Elsevier Science B.V.

\* cited by examiner

GRAVITY SURVEY DATA PROCESSING

This application is the National Phase of PCT/GB2008/050059, filed Jan. 30, 2008, which claims priority to Great Britain Application No. 0701725.4, filed Jan. 30, 2007, the disclosures of which are hereby incorporated by reference in their entirety.

FIELD OF THE INVENTION

This invention relates to improved techniques for processing potential field measurement data from airborne surveys such as gravity surveys, and to methods, apparatus and computer program code for such techniques.

BACKGROUND TO THE INVENTION

In this specification we will refer to airborne surveys, and more particularly to gravity surveys. However the techniques we describe are not limited to these types of survey and may be applied to other potential field surveys including, but not limited to, magnetic field surveys such as magnetotelluric surveys, electromagnetic surveys and the like.

A potential field survey is performed by measuring potential field data which, for a gravity survey, may comprise one or more of gravimeter data (measuring gravity field) or gravity gradiometer data (measuring gravity field gradient), vector magnetometer data, true magnetic gradiometer data, and other types of data well-known to those skilled in the art. A common aim of a geophysical potential field survey is to search for signatures which potentially indicate valuable mineral deposits. Conventionally airborne potential field surveys such as gravity surveys are flown on a grid pattern. The grid is defined by orthogonal sets of parallel lines (flight paths) on a two-dimensional surface which is draped over the underlying terrain. However the draped surface is constrained by the closest the aircraft is permitted to fly to the ground and the maximum rate of climb/descent of the aircraft. Some improved techniques for airborne potential field surveys, which facilitate the collection of data from close to the ground, are described in the applicant's co-pending PCT patent application "Gravity Survey Data Processing", PCT/GB2006/050211, hereby incorporated by reference in its entirety.

After the potential field data has been collected but prior to interpreting the data a terrain correction is generally applied, compensating for surface height variations. A surface profile may be purchased in the form of digital terrain elevation data or determined from (D)GPS ((Differential) Global Position System) and/or airborne techniques such as LIDAR (Laser Imaging Detection and Ranging) and SAR (synthetic aperture radar). Aircraft acceleration, attitude, angular rate and angular acceleration data may also be used to correct the output data of the potential field instrumentation. We describe some improved techniques for terrain correction in geophysical surveys in our co-pending UK patent application "Terrain Correction Systems", no. 0601482.3, filed 25 Jan. 2006, also hereby incorporated by reference in its entirety.

However despite the improved techniques we have previously described low frequency noise or drift in airborne survey measurements remains a problem. (Although the term drift sometimes refers to a random monotonic variation, in this specification it is used to represent any form of correlated noise with a characteristic frequency much less than dominant signals of interest).

The term "levelling" is used in the art as a generic term to cover conventional techniques for data conditioning. These techniques include removal of low frequency drift, matching low frequency content of neighbouring lines, and referencing data to a fixed height plane. For example the intersection points of a standard gridded survey can be used for cross-over levelling, where the data along survey lines are adjusted to minimise differences at these points.

There is, however, a need for improved data processing and, in particular, for improved handling of noise.

SUMMARY OF THE INVENTION

According to a first aspect of the invention there is therefore provided a method of processing measured potential field data from an airborne or marine potential field survey to determine a set of field mapping parameters for mapping a field, the method comprising: inputting the measured potential field data, the measured potential field data comprising data defining a plurality of potential field measurements each with an associated measurement position and measurement time; and determining the set of field mapping parameters using a model comprising a combination of a spatial part representing a spatial variation of the potential field and a temporal part representing time domain noise in the measured potential field data, wherein the determining comprises fitting the measured potential field data to both the spatial and temporal parts of the model.

In some preferred embodiments the spatial and temporal parts of the model comprise spatial and temporal terms of a model equation which are jointly determined to determine the field mapping parameters. Preferably the model has a linear form; this simplifies the inversion. In particular, the model may have the form $$f(x,y,z,t) = A\rho(x,y,z) + B\lambda(t) \quad (1)$$

where $\rho$ and $\lambda$ are vectors of spatial and temporal model parameters respectively, A and B are matrices, and f comprises a forward calculation vector of measurements estimated from the model.

Preferably the model has a sufficiently high temporal resolution for intervals between measurements to be less than an expected correlation time of the instrument or measurement noise. Thus preferably the time between nodal points is selected responsive to a measured or expected, characteristic or correlation time of noise in the measured data; this may be obtained from a manufacturer's data sheet on the measuring instrument.

In some preferred embodiments the spatial part of the model satisfies Laplace's equation. Preferably the spatial part of the model comprises an equivalent source model.

Preferably the temporal part of the model comprises a line defined by discrete points in time (nodal points). In embodiments the line comprises a set of piece-wise linear sections joining these nodal points; in other embodiments higher order interpolation functions may be employed. Preferably the nodal points are at time intervals of at least 60, 120, 180, 240, 300, 360, or 420 seconds. Preferably the noise model represents measurement drift (which need not be monotonic).

Preferably the determining of the field mapping parameters comprises solving a system of simultaneous equations. Since the equations may be ill-conditioned, preferably regularisation is employed, but preferably the spatial and temporal parts of the model are separately regularised to facilitate distinguishing between drift and genuine spatial variations. Thus in some preferred embodiments a gradient regularisation is employed for the spatial part of the model and a different type of regularisation, for example a Tikhonov regularisation is employed for the temporal part of the model. This helps, for example, to distinguish between a genuine spatial variation and instrument drift—which may be, say, in different spatial directions in adjacent survey lines flown in opposite directions. It will be appreciated that in embodiments of the techniques we describe the field mapping parameters are determined by fitting to a model using data from potential field measurements from a plurality of different survey lines simultaneously (in the sense that the fitting of the measured data to the model determines a global fit for a plurality of survey lines for, in embodiments, all the processed measurement data).

Thus in embodiments the fitting comprises jointly fitting data from potential field measurements from a plurality of different survey lines of the (airborne) potential field survey, extending along the lengths of the lines. These survey lines may be substantially parallel, or substantially non-parallel, for example substantially orthogonal. In embodiments the survey lines comprise more than two and preferably substantially all the flight lines of the survey—in other words in preferred embodiments substantially all the data collected from the survey is provided to the model which models both spatial and temporal variation for the complete survey. (In this latter case the survey preferably comprises a plurality of flight lines arranged to cover a surveyed region, which may be of any reasonable physical extent).

The measured potential field data preferably comprises gravity data such as gravimeter data (measuring gravity field) and/or gravity gradiometer data (measuring gravity field gradient) and may include multiple components. For example the measured potential field data may comprise gravity gradient component $G_{zz}$. Thus in embodiments the mapped field comprises a gravity field, although this may be represented by gravity gradient data. In other embodiments, however, the measured potential field data may comprise vector magnetometer data, true magnetic gradiometer data, or other potential field data (for example scalar gravimetry data).

The field mapping parameters preferably comprise parameters or coefficients which allow characterisation of the potential field, and, in particular which may be used to generate similar potential field data, in embodiments from a forward calculation.

Thus in embodiments the parameter values define a potential field, for example a gravity field or gravity gradient field, which represents a best fit to the measured potential field data. This best fit preferably minimises a residual which depends upon a difference between a forward calculation of potential field from the model and the measured potential field data, for example a mean squared error, a modulus difference value, or some other residual.

In embodiments the field mapping parameters are derived from the spatial part of the model and may comprise values for equivalent source mass elements or, more generally, equivalent source elements with an associated source strength in which case the field mapping parameters may comprise these source strengths.

In embodiments the method further comprises determining a map using the set of field mapping parameters, and this may depict either potential field data or data derived from the potential field data, for example after additional processing. Such a map may display either two-dimensional or three-dimensional data and, in embodiments, the map is constructed by performing a forward calculation to determine a potential field, for example on a surface, from the set of field mapping parameters. The field mapping parameters may be used in a forward calculation for example to allow a potential field such as a gravity field or gravity gradient field or an associated scalar potential to be determined and/or mapped.

The skilled person will understand that generally, when measuring potential field data, what is actually measured is gravity and/or gravity gradient (although other quantities derived from spatial derivatives of the potential field may additionally or alternatively be measured).

In some preferred embodiments of the method which use an equivalent source representation the surface mass (or density) values for a plurality of surface mass elements, preferably on a planar surface (but not necessarily, since the surface may be chosen to approximate a surface of the earth in the surveyed region) is used in a forward calculation to map one or more components of the field on a flat mapping plane or some other convenient surface.

In another related aspect of the invention there is provided an equivalent source method of processing measured potential field data to determine field mapping data, in which the measured potential field data is modelled as a combination of a space-domain signal and a time-domain noise component, the method comprising determining a joint best fit of the measured potential field data to the modelled combination.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another, for example distributed across a network.

The invention further provides a data processing system configured to implement embodiments of the above-described methods.

Thus in a further aspect the invention provides a data processing system for processing measured potential field data from a potential field survey to determine a set of field mapping parameters for mapping a field, the system comprising: data memory for the measured potential field data, the measured potential field data comprising data defining a plurality of potential field measurements each with an associated measurement position and measurement time; and program memory storing processor control code; and a processor coupled to the data memory and to the program memory, to load and implement the control code, the code comprising code for controlling the processor to: input the measured potential field data; and determine the set of field mapping parameters using a model comprising a combination of a spatial part representing a spatial variation of the potential field and a temporal part representing time domain noise in the measured potential field data, wherein the code to determine the set of field mapping parameters is configured to fit the measured potential field data to both the spatial and temporal parts of the model.

The invention still further provides a carrier carrying a data structure, the data structure comprising data defining values of at least A and ρ, wherein A and ρ are defined such that for a set of potential field measurements m(x, y, z, t), a value of L(f, m) is minimised, where L(f, m) represents a measure of a difference between f and m, where $$f(x,y,z,t)=A\rho(x,y,z)+B\lambda(t) \quad (1)$$

where ρ and λ are vectors of spatial and temporal model parameters respectively, A and B are matrices, and wherein the data carried by the data structure is associated with or includes the set of the measurements m(x, y, z, t).

The invention still further provides a carrier carrying a data structure defining a map derived from data defining values of at least A and ρ, wherein A and ρ are defined such that for a set of potential field measurements m(x, y, z, t), a value of L(f, m) is minimised, where L(f, m) represents a measure of a difference between f and m, where $$f(x,y,z,t)=A\rho(x,y,z)+B\lambda(t) \quad (1)$$

where ρ and λ are vectors of spatial and temporal model parameters respectively, A and B are matrices, and wherein the data carried by the data structure is associated with or includes the set of the measurements m(x, y, z, t).

The invention still further provides a data carrier such as described above carrying a set of field mapping parameters determined by a method as previously described.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

We will describe techniques which, in embodiments, employ joint equivalent source and time domain drift modelling for measured potential field data. Where we refer to a field, in particular a gravity field, this is not limited to a vector field but includes scalar and tensor fields, a potential field and any derivatives deriving from the potential field.

Potential field data includes, but is not limited to, gravimeter data, gravity gradiometer data, vector magnetometer data and true magnetic gradiometer data. Elements and representations of a potential field may be derived from a scalar quantity.

For gravity, the relevant potential is the gravity scalar potential, $\Phi(r)$, defined as $$\Phi(r) = \iiint \frac{G\rho(r')}{|r-r'|}d^3r' \quad (2)$$

where r, ρ(r'), G are respectively, the position of measurement of the gravity field, the mass density at location r', and the gravitational constant. The gravitational acceleration, which is how a gravitational field is experienced, is the spatial derivative of the scalar potential. Gravity is a vector in that it has directionality. It is represented by three components with respect to any chosen Cartesian coordinate system as:

$$g = (g_x, g_y, g_z) = \left(\frac{\partial \Phi(r)}{\partial x}, \frac{\partial \Phi(r)}{\partial y}, \frac{\partial \Phi(r)}{\partial z}\right) \quad (3)$$

Each of these three components varies in each of the three directions and the nine quantities so generated form the Gravity gradient tensor:

$$G = \begin{pmatrix} G_{xx} & G_{xy} & G_{xz} \\ G_{yx} & G_{yy} & G_{yz} \\ G_{zx} & G_{zy} & G_{zz} \end{pmatrix} = \begin{pmatrix} \frac{\partial}{\partial x}\frac{\partial \Phi(r)}{\partial x} & \frac{\partial}{\partial x}\frac{\partial \Phi(r)}{\partial y} & \frac{\partial}{\partial x}\frac{\partial \Phi(r)}{\partial z} \\ \frac{\partial}{\partial y}\frac{\partial \Phi(r)}{\partial x} & \frac{\partial}{\partial y}\frac{\partial \Phi(r)}{\partial y} & \frac{\partial}{\partial y}\frac{\partial \Phi(r)}{\partial z} \\ \frac{\partial}{\partial z}\frac{\partial \Phi(r)}{\partial x} & \frac{\partial}{\partial z}\frac{\partial \Phi(r)}{\partial y} & \frac{\partial}{\partial z}\frac{\partial \Phi(r)}{\partial z} \end{pmatrix} \quad (4)$$

The fundamental equations and relationships of potential fields follow from analysis of the properties of the scalar potential function, its derivatives, its Fourier transforms and other mathematical quantities.

From one of Green's theorems, in the event that any of the spatial derivatives of the scalar potential (including the scalar potential itself) are known over a closed surface, then the value of that spatial derivative is known at all points within the volume enclosed by that surface. A corollary to this is that once this quantity is known at all points, by differentiation and integration, all other derivatives of the scalar potential can be derived including the scalar potential itself. Thus the scalar potential and all of its derivatives are effectively known at all points within a volume when just one of its derivatives is known over a surface closing that volume. This indicates that a full measurement of any component of any of the derivatives of the scalar potential allows the calculation of any other component of any derivative of the scalar potential. Following from this it also does not matter, at least in theory, which quantity is measured, the choice of instrumentation comes down simply to which instrument measures the desired quantity with the largest signal to noise.

Differentiation of the gravity scalar potential above ultimately yields:

$$\nabla^2 \Phi(r) = \frac{\partial^2 \Phi(r)}{\partial x^2} + \frac{\partial^2 \Phi(r)}{\partial y^2} + \frac{\partial^2 \Phi(r)}{\partial z^2} = -4\pi G\rho(r) \quad (5)$$

which, in regions where there is no matter reduces to Laplace's equation, an important fundamental relationship in gravity:

$$\nabla^2 \Phi(r) = \frac{\partial^2 \Phi(r)}{\partial x^2} + \frac{\partial^2 \Phi(r)}{\partial y^2} + \frac{\partial^2 \Phi(r)}{\partial z^2} = 0 \quad (6)$$

Harmonic functions satisfy Laplace's equation and they have many properties which may be utilised in the analysis of data collected from potential field surveys.

Data may be analysed and processed using a range of techniques which work with the data collected from the survey as a starting point but which thereafter alter both the data and/or its format so the values associated with the measured quantities all appear on a regular 2-D grid which is on a horizontal, fixed altitude analysis plane (levelling and gridding).

In gridding, broadly speaking the surveyed region is divided into rectangular cells whose sides are preferably aligned to the principle directions flown for the survey, and then the actual measurement data is replaced with data (gridded data) which is "equivalent" to the measured data but which is now assigned values at points in the middle of each cell. The dimension of each cell may be chosen based on the average separation of lines flown in the two orthogonal directions. Once the data is in this gridded format, it is much more tractable mathematically. The data may be treated as set of numbers and may be processed, for example by statistical or other methods, to give a best estimate of the potential field on the horizontal analysis plane.

We have previously described an improved, equivalent source-type method (see PCT/GB2006/050211, hereby incorporated by reference).

Equivalent Source Methods

It is helpful, as background to assist in understanding embodiments of the invention, to describe some aspects of equivalent source modelling methods.

We observe that the gravitational field outside a body can be modelled as if it came from matter situated entirely in a vanishingly thin layer at the surface of the body and which accurately follows the surface of the body. Such a layer defines a two-dimensional equivalent source—i.e. a source of gravity which produces substantially (theoretically exactly) the same gravity signature as does the body itself. There are many ways in which equivalent sources can be defined—they can be as above or they can be strictly horizontal, they can be all or partly above or below the surface of the earth; they may be two- or three-dimensional. However they have the general property that they aim to generate substantially the same gravitational field as is generated by surveyed portion of the earth. For further information reference may be made to R. J. Blakely, "Potential Theory in Gravity and Magnetic Applications", Cambridge University Press, 1995.

In a survey one can measure $G_{zz}$ as a function of position, $r_{measure}$, using a gravity gradiometer and work with this without needing to generate the other elements of the gravity gradient tensor. This can be used to generate a representation of the underlying mass distribution. The above mentioned Green's theorem shows that the underlying mass distribution can be derived, in principle from $G_{zz}$, although in embodiments of the techniques we describe later Green's theorem need not be used explicitly.

In an example equivalent source method the surface of the survey area is broken up into small pieces, typically of order 50 m on a side, which may be termed platelets or mass elements. The resolution of the model may be chosen to broadly correspond with the resolution of the measurements. It is easy to forward calculate the gravity from each platelet (see, for example, R. J. Blakely, "Potential Theory in Gravity and Magnetic Applications", Cambridge University Press, 1995), the mass of which is adjusted until the best overall fit to the measured data is obtained. This mass determination may use a standard least squares fitting procedure. The fit may be obtained by matching the data at the true measurement position to the gravity field generated by the proposed equivalent source at the identical true measurement positions. This process is mathematically rigorous and need not introduce any artificial adjustments to the data in order that it conforms to a horizontal rectangular survey.

Once a fit is obtained, the model is deemed to be the primary data set. All subsequent analysis to determine geological structure may (but need not necessarily) then compare and minimise differences between the gravitational field that any given geological structure would generate and that generated by the equivalent source. One significant advantage of this technique is that the best fit comes from a mass distribution, albeit a synthetic one, and therefore the best fit solution will automatically satisfy Laplace's equation. This is an improvement over a method which produces a numerical best fit but which does not impose the added restriction that the data has to satisfy Laplace's equation, i.e. that it could come from a real mass distribution.

An equivalent source method does not have to use a surface conformal to the topography, it can use sources which cover any surface which may or may not be at constant altitude, above or below the earth's true surface, which may or may not cut through the earth's true surface and so forth. Further, an equivalent source method does not have to use a surface but can employ a three-dimensional model. Likewise, the platelets can be of any size or shape in two or three dimensions (or can even be point-like), and they do not even need to correspond in size or shape—indeed, it helps the efficiency of the analysis if their size and geometry is allowed to vary depending upon how fast the topography is and/or geology might be varying in each region.

An equivalent source following the topography, or even the underlying geology insofar as it can be reasonably inferred, is likely to produce less variation in mass of the individual platelets but the overall result is not, in principle, dramatically affected by any reasonable choice. Thus, for example, if the presence of a particular geological layer or, say, geological anomaly, e.g. a kimberlite pipe, is suspected an equivalent source can be defined to take account of this. Likewise more sources can be added in regions where there is more detail or rapid change of the geological structure. Thus in some respects the choice of equivalent source shapes can be thought of as similar to discretising an engineering product for finite element analysis.

In part the mathematical complexity of the process is determined by the number of sources used and by how many of these sources are used in the analysis at each position on the survey. One advantage of the technique is that for some components of gravity or gravity gradient it is possible to use just sources in the region of the data point, which can substantially reduce the complexity of the analysis. The threshold distance is typically a few kilometers, for example in the range 1 to 10 kilometers, although it depends to some extent upon the geography (for example the distance may need to be extended to encompass a large nearby mountain). For example, a source element on one side of a survey region is unlikely to contribute significantly to the measured field on the other side of the survey region, and where the influence of the source element is much less than the expected or actual noise such contributions can be ignored (set to zero). This is helpful because such a matrix may comprise, for example, 100K by 500K matrix elements and the processing burden is significantly reduced if these are mostly zeros.

Later we define an equation in which contributions of source elements to a measured signal depends on a matrix of source-influence values, and where (as is common in practice) the influence of many sources can be ignored, this matrix becomes a sparse matrix, allowing more efficient numerical processing.

Once an equivalent source has been generated, it is then possible to predict any derivative of the gravity scalar potential on a surface by direct forward calculation. This process is helpful both from an analysis and from a visualisation perspective. Thus once a set of mass elements has been found a forward calculation (i.e. summing the effects of the mass elements) allows other scalar potential components to be derived and, by differentiation other components of G. The deduced values of G can be compared with a geological model (referred to as an "interpretation") to determine the underlying geological structure.

In more detail, given the masses (or densities) of each source element, a straightforward calculation is used to predict what value would be obtained for the measured quantity—say a component of the gravity vector or of the gravity gradient tensor—at every measurement point. In general, this will be a summation of the form shown below. Here we use gg as notation for the measured quantity which, as noted above, is $G_{zz}$ in some preferred embodiments.

$$gg_{calculated}(r_{measure}) = \sum_{all\text{-}masses} m_{mass\text{-}element} F(r_{measure} - r_{mass\text{-}element}) \qquad (7)$$

In the above equation F is called a Greens function (Blakely, ibid, at page 185, incorporated by reference) and $r_{mass\text{-}element}$ defines the location of the mass element (for example the centre of gravity or some other defined point).

The functions F are standard functions, well known to those skilled in the art (and its applications are not limited to gravity surveys). It is, essentially, the influence a source (mass element) of unity mass or density and defined shape would have at the relevant (measurement) point. The source may be a point source, sphere or ellipsoid but, in practical applications of the technique, the source is more often a prism, which may be irregular. A number of textbooks list Greens functions for simple shapes; functions for more complex source geometries can be found in the literature. Moreover the source influence superposes so that if a complex shape can be discretised into a plurality of simpler shapes then the Greens functions for the discrete shapes can be added together. This in principle allows numerical values for the Greens function of any arbitrary shape to be determined, although in practice relatively simple shapes are generally preferable. By way of example, the Green's function F for a rectangular prism is defined in Blakely, ibid, at page 187, and which is specifically incorporated by reference; this has 8 terms each of which corresponds to a vertex of the prism.

An equivalent source inversion method can combine multiple measurements of a potential field distribution (the observables of a potential field are actually the spatial derivatives) into a single model. The method involves finding the parameters of a source model (for example density or geometry) in such a way that data calculated from the model fit a given set of measurements. An inverted equivalent source model can then regenerate the signal in the measurements, and within limits, can be used to re-project the data to different locations. In general, the number of adjustable model parameters is less than the number of independent measurements so, by the law of averages, signals recalculated from the model tend to have signal to noise ratios superior to the original measurements.

The equivalent source construction is more than a measurement averaging technique because it represents a convenient and tangible method of formulating a set of spatial basis functions which support the functional form of the signal underlying the measurements. The basis functions can permit the combination of different types of potential field measurements, for example; gravity and gravity gradient tensor measurements can all be inverted to a single model. The basis functions can also tend to make the inverted model more immune to some erroneous variations in the measurements since if these do not appear like genuine potential fields, they will not be supported by the functional form of the model. An equivalent source model can further focus its function space by excluding solutions that are known to be physically infeasible. For example, an equivalent source model placed at or below ground level will naturally filter out unphysical high frequency variations in the measurements (although the model can, in principle, be placed anywhere). Such variations could otherwise generate large errors in a less constrained model.

Increasing the ratio of the number of measurements to the model degrees of freedom improves the accuracy of the inversion making the resulting equivalent source model less sensitive to measurement noise and interference. In many cases however, because of the practical difficulties associated with acquiring a complete sampling of a potential field variation, this ratio often falls short of favourable and the equivalent source inversion can become compromised.

Low frequency noise (drift) in airborne survey measurements degrades the inversion process because these phenomena can resemble genuine signal (although the term drift usually refers to a random monotonic variation, in this specification it is used to represent any form of correlated noise with a characteristic frequency much less than dominant signals of interest). Such variation can therefore be readily accommodated by the equivalent source model especially in places where it is underdetermined. Results from subsequent equivalent source forward calculations then exhibit spurious features correlated with the measurement pattern. In addition to this, the coherent components of noise do not average out in the inversion process and therefore lead to an inferior model parameter estimation.

We thus describe below an augmentation of the equivalent source technique that introduces a separate model to accommodate correlated time domain noise. By using a separate model, operating simultaneously with the equivalent source model, one can make the source parameter estimation less susceptible to this type of noise in the measurements. After the inversion, the augmented model can separately predict the desired potential field spatial distribution and the long wavelength time domain noise accompanying the measurements.
Joint Equivalent Source and Time Domain Drift Modelling A measurement, m taken at location (x, y, z) and time t from a geophysical survey can be broken down into a series of terms, $$m(x,y,z,t) = S(x,y,z) + I(t) + C(t) + n \qquad (8)$$

where S(x, y, z) represents the signal, I(t) the sources of interference, C(t) correlated noise and n purely random noise. The main goal of processing after a survey is to determine, with the best accuracy, the true signal S(x, y, z). Sources of interference I(t) are correctable by suitable measurements of the underlying disturbances and corresponding error coupling transfer functions. In theory, after these corrections, the only remaining unwanted terms are the correlated noise C(t) and the white noise n. The white noise is fundamental and its effects can only be reduced by the law of averages through multiple measurements. Much of the power in correlated noise can, however, be modelled by an interpolation function with a time period that is similar or shorter than the characteristic time period of the noise.

Figure 1:
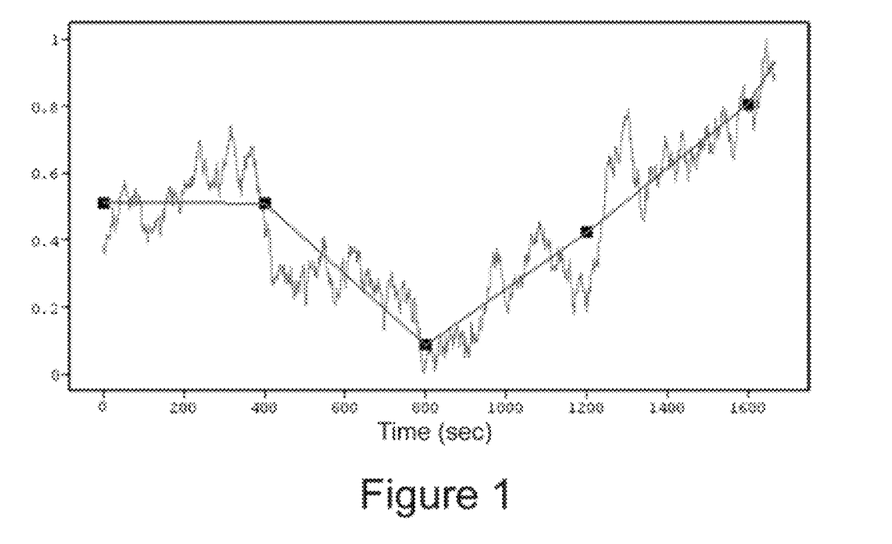
FIG. 1 shows an example time-domain interpolation function for a joint equivalent source and time domain drift model according to an embodiment of the invention.

FIG. 1 shows a simple time-domain interpolation function, constructed by stringing together piece-wise linear sections at regular intervals. More particularly, FIG. 1 shows exponentially correlated noise with a 500 second characteristic time modelled by a piece-wise linear interpolator connecting nodal points (squares) every 400 seconds.

The interpolator is continuous across the range, but has discontinuous derivatives at the nodal points. The model is entirely specified by the values at the nodal points therefore making the number of degrees of freedom equal to the number of nodal points. In this case, the nodal values become the model fit parameters in an optimisation (see below). If more complicated interpolation functions are used, for example; higher order polynomials or splines, then the number of degrees of freedom will be more. As demonstrated by FIG. 1, the long wavelength components of correlated noise can be modelled well by a basic interpolator with time period slightly less than that of the noise. The simultaneous equivalent source and time domain drift model we describe allows a low order drift model to absorb much of the time domain correlated noise within a set of measurements leaving the equivalent source model to fit only the spatially correlated signal. The remaining un-modelled part of the measurements (the residual fit) is then largely white noise showing that the inversion statistics are consistent with good model parameter estimation.

In the case of a linear inversion model, the augmented model can be written as $$f(x,y,z,t)=A\rho(x,y,z)+B\lambda(t) \quad (1)$$

where f is the model forward calculation vector of measurements, ρ is the vector of equivalent source model parameters (for example, density of discrete mass source units), A is a matrix that relates the responses of the source elements to the measurement locations, λ is the vector of drift model parameters (for example, nodal values in a piece-wise linear model) and B is the matrix that relates the drift model interpolation to the times of the measurements. In this form, given a set of measurements m(x, y, z, t), the model parameters ρ and λ can be determined by any standard optimisation technique that minimises the residual in the fit, $$\text{minimise}[L(f-m)] \quad (9)$$

where L represents a measure of the residual; the $L_2$ norm for example making the optimisation a least squares fit. Minimising squared error, an $L_2$ noun, has the advantage of being easy to calculate and there are many commercially available mathematical packages/library components for implementing a least squares fit. A variant is to use a modulus instead (an $L_1$ norm). This tends to de-emphasise outlier data points making the optimisation more robust; again suitable mathematical packages/library components are commercially available but the computational overhead can be larger (since the underlying mathematics is harder).

After the full inversion, the equivalent source term is used in isolation to either estimate the original signal underlying the measurements, $$A\rho=S(x,y,z) \quad (10)$$

or to predict different quantities at possibly different locations. Similarly, the second term in (9) can be used in isolation to estimate the drift in the measurements, $$B\lambda=C(t). \quad (11)$$

The model of equation (1) may be extended to jointly model signals from multiple sources of measured potential field data. In this case a common equivalent source model may be employed for the different sources of measured potential field data but preferably separate noise (drift) terms are included in the model for each different measured data source. The different sources of measured potential field data may be, for example, different devices measuring different components of G ($G_{xx}$, $G_{yy}$, $G_{zz}$, $G_{xy}$, $G_{xz}$, $G_{yz}$—thus there may be six different devices of this type) and/or different devices measuring g ($g_x$, $g_y$, $g_z$—thus there may be three devices of this type). For example, one or more components of gravity and gravity gradient potential field data may be jointly measured in this way with multiple measuring devices (although these may be combined in a single instrument). The best fit minimisation may be performed in a similar way to that outlined above (and discussed further below), albeit with more drift parameters to determine.

At this point, it is helpful to explain in more detail the matrices A and B and the vectors ρ and λ. Continuing to refer to the spatial part of the model, an initial step is generally to build a model that follows the terrain in the region of the survey. The model is discretised into a set of finite elements, each of which defining a mass element whose density is to be determined by the inverse solution. The matrix element $A_{i,j}$ represents the model forward calculated signal contributed from mass element j at the position of measurement i when unit density is ascribed to the mass element. The type of forward calculation employed follows the measurement signal type, for example; if measurements n and m were taken at the same position, but measurement n is of gravity gradient $G_{zz}$ and measurement m is of gravity gradient $G_{xx}$ then the corresponding forward calculations from mass element j, $A_{n,j}$ and $A_{m,j}$ will correspond to $G_{zz}$ and $G_{xx}$ accordingly.

The vector ρ defines the set of actual densities of the mass elements defining the model and after the optimisation, contains the equivalent source part of the solution. Thus the vector ρ effectively provides a set of parameters mapping the field. As mentioned above, the product Aρ aims to predict the actual signal within the measurements.

To facilitate the optimisation of (1), approximations can be introduced during the construction of matrix A. These can take the form of truncation (where negligible matrix elements are replaced with zeros) or averaging where the affects of several individual elements are combined into a single element representing the average affect. Both of the above approximations become valid when the distance between the measurement point and the source element becomes large compared to the size of the source. When using such approximations, spatial matrix A becomes sparse allowing more efficient numerical matrix computations.

The elements of matrix B define the equations that relate the predicted drift in the measurements to the drift model parameters, λ. For the case of a piece-wise linear interpolation function (refer to FIG. 1), if the ith measurement was taken at time $t_i$ which falls between the nodal drift parameters $\lambda_j$ and $\lambda_{j+1}$ defined at (nodal point) times $T_j$ and $T_{j+1}$, then the linear interpolated prediction for the drift in the measurement is given by $$C(t_i) = \lambda_j + (t_i - T_j)\left(\frac{\lambda_{j+1} - \lambda_j}{T_{j+1} - T_j}\right). \quad (12)$$

Expressed in accordance with the matrix equation (9), the above equation defines the matrix elements $B_{i,j}$ and $B_{i,j+1}$ as follows:

$$B_{i,j} = 1 - \left(\frac{t_i - T_j}{T_{j+1} - T_j}\right) \quad (13)$$

$$B_{i,j+1} = \left(\frac{t_i - T_j}{T_{j+1} - T_j}\right).$$

The times, $T_j$ of the drift nodal parameters define the resolution of the drift model. When there is a break in the measurement data set, for example at the end of a survey line, or when data recording is suspended for some reason, it is preferable to restart the drift model by forcing a drift parameter at the time at which the measurements are resumed.

When dealing with multiple measurement types in the same survey (e.g. where there are several instrument output channels), it is convenient to partition the matrix equation (1) up so that each measurement type occupies a block of rows in the matrices A and B. This way, the first group of drift parameters in λ represent the modelled drift for the first measurement type, the second set represents the second measurement type and so on. It is important to note that, although each measurement type has its own drift model, there is only one equivalent source model.

If the spectrum of the residual, (f–m) is not sufficiently white in the time domain, then this indicates that the drift model resolution my be inadequate and benefit could be gained by a shorter time period or a higher order interpolator. Similarly, if the residual is coloured in the space domain, it may indicate that the equivalent source model is over-constrained. If, after these considerations, the residual still shows appreciable correlation there may be a more fundamental problem such as excessive interference in the measurements or a badly designed equivalent source model for example.

Because the nature of the signal and the drift is very different, one being correlated in the space domain and the other correlated in the time domain, the partitioning of these quantities into the two terms on the right hand side of (1) tends to happen naturally during the optimisation. To illustrate this, consider two adjacent lines from an airborne survey. Although the drift is highly correlated along the individual lines, when viewed in the space domain, there is no correlation between the lines—the adjacent lines could have been acquired weeks apart, or even by different instruments. During an optimisation of (9), because this type of variation is not fitted well be an equivalent source model, it tends to get assigned correctly to the drift model term. Conversely, genuine signal generally appears outside of the bandwidth of the drift model and is therefore preferentially assigned to the equivalent source model term.

There are however many situations, especially in an underdetermined case, where it is difficult to distinguish between low frequency instrument noise and genuine long wavelength signal. If the drifts along adjacent lines happen to have the same general trend, the noise can appear to be spatially correlated and, during the inversion, can enter and corrupt the equivalent source term. Conversely, long wavelength geological signal can easily appear as drift in the time domain therefore finding itself attributed to the wrong term in (1). The result is a loss of signal power in the equivalent source predictions (10) coupled with unwanted noise trends.

To add a level of control over this problem, one can introduce separate regularisation for the two parts of the augmented model (1). Gradient regularisation is preferred for the equivalent source density distribution ρ since, provided the geometry of the model resembles something physically plausible, real-world density distributions tend to have smooth variations. Preferentially choosing density solutions that are smoother will therefore tend to improve the integrity of the inversion. For the drift model parameters, λ, standard Tikhonov regularisation is a preferred choice. Under regularisation, (9) takes the form $$\text{minimise}[L(f-m) + a((\nabla\rho \cdot \nabla\rho) + b(\lambda \cdot \lambda))] \quad (14)$$

where a is the overall regularisation factor and b controls the relative regularisation between the two models (in practice the regularisation terms are normalised by the model matrices). Increasing b will make the model more equivalent source dominant by ascribing ambiguous variation in the measurements preferentially to a density variation rather than a drift. There is no definitive method for deducing the correct values for regularisation factors, but 'L-curve' analysis and other empirical methods can give a guide to determining the best regularisation trade-off between the fit to the measurements and the behaviour of the solution. Ultimately, a sequence of parameter tests is required to determine the best values for a and b.

Thus, broadly speaking, in some preferred embodiments regularisation is introduced which, in the spatial part of the model, aims to find the smoothest distribution that fits the measurements (suspected large changes in density underground are preferably taken into account, where possible, by design of the initial source element model). Broadly a value of a determines to what degree to force a smooth solution on the model and in practice this parameter may be varied according to the expected underlying geology and in order to achieve what appears to be a good result. Further, however, choosing a large value for b de-emphasises the drift model terms (since smaller drift model terms are then needed for the overall minimisation of Equation (14)).

However, the most effective way of resolving the ambiguity between drift and signal is to ensure that there are sufficient measurements in a survey that are close in space but well separated in time. Consider, for example, the points in a survey data set where two lines (often perpendicular) cross. At these locations, the signal, S(x, y, z), is common to the two measurements on either line. (A pair of measurements may be considered a valid cross-over point if their separation is sufficiently small compared to the correlation width of the signal, commensurable with the height of the survey). The difference between the measurements taken at times $t_1$ and $t_2$ should therefore be only due to the correlated noise, $I(t_2) - I(t_1)$ plus some random noise. In the matrix construction of (1), these point pairs give rise to duplicated rows in the equivalent source term, but independent rows in the drift model term. Together, they therefore provide equations that only substantially influence the drift solution and can therefore resolve the ambiguity between long wavelength signal and drift. By accounting for the spatial variation of the signal, the simultaneous equivalent source and drift model solution is more accurate than cross-over levelling because the drift model is essentially deduced from measurements in the survey at multiple positions on different survey lines, potentially all the measurements, rather than just those at intersection points.

To demonstrate the performance of the combined equivalent source and drift model, a synthetic example is presented.

Figure 2:
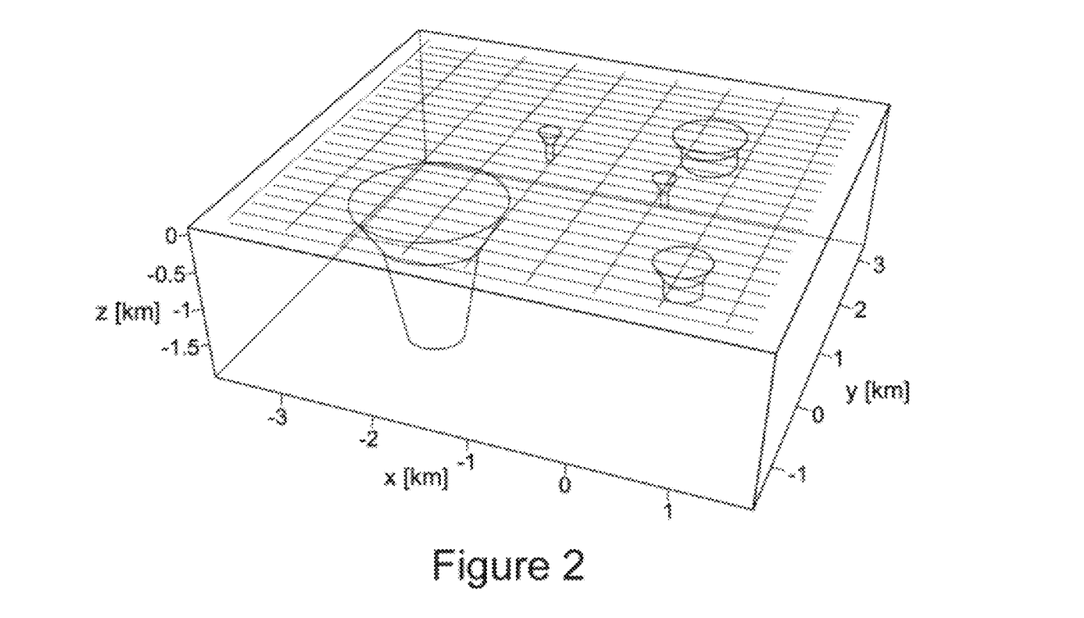
FIG. 2 shows a synthetic model and simulated flight pattern.

The synthetic model comprises a selection of 5 kimberlite pipes with various sizes surveyed by an airborne gravity gradiometer following a regular survey flight pattern, as shown in FIG. 2, which illustrates a synthetic model and simulated flight pattern.

Figure 3A:
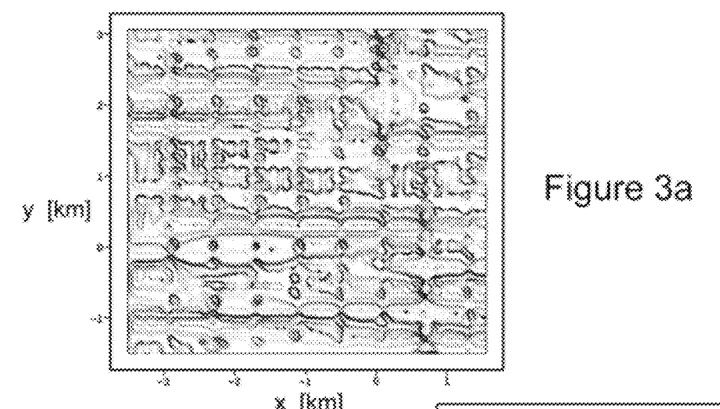
FIGS. 3a to 3c show a comparison of predicted $G_{zz}$ from equivalent source inversions using synthetic measurements: a) without drift modelling (spatial equivalent source only), b) with simultaneous drift modelling (augmented model), according to an embodiment of the invention, and c) with no synthetic measurement noise added to the model (true signal-no noise)
Figure 3B:
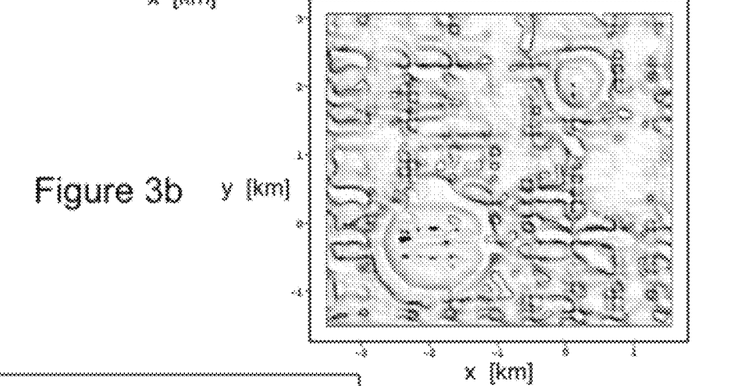
Figure 3C:
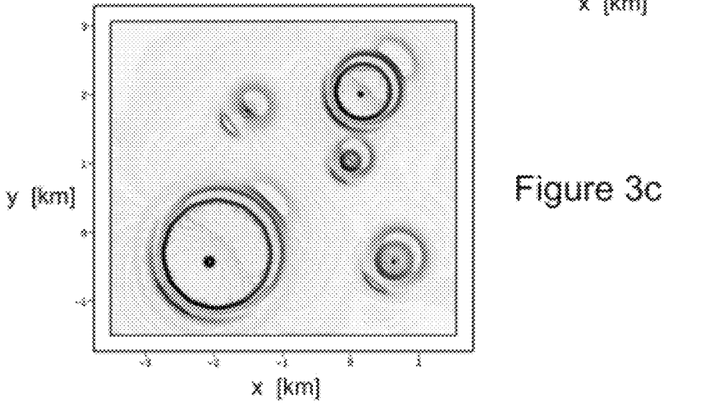

In the simulation, the gravity gradient component, $G_{zz}$, was forward calculated to the locations of the survey pattern to represent the signal measured by a gravity gradiometer. Exponentially correlated time domain noise was then added to the synthetic signal to represent drift and other low frequency noise that would be present in a real measurement system. The simulated measurements were used to invert an equivalent source model firstly without and then with the addition of the drift model. In both cases, the inverted model was used to forward calculate $G_{zz}$ to a gridded set of points having the same height as the original survey. FIG. 3 shows a comparison of predicted $G_{zz}$ from equivalent source inversions using synthetic measurements: a) without, b) with simultaneous drift modelling, c) Perfect answer achieved with no synthetic measurement noise added to the model.

In the above example, to illustrate the current method, no extra noise reduction processing procedures were performed on the data, although in practice conventional noise reduction techniques such as filtering/conditioning could (and often preferably would) also be used. The results deriving from the augmented equivalent source model (b) clearly show a level of robustness and immunity against the correlated noise in the measurements. Without this augmentation, the results (a) show severe artefacts correlated with the survey pattern and an almost complete masking of the true signal.

Thus augmenting an equivalent source inversion method with a time domain drift model and subsequently solving for both models simultaneously provides a method of reliably processing potential field data sets that contain significant low frequency noise.

Although a degree of low frequency noise can be removed by conventional levelling procedures, these methods fail, for example when the survey has insufficient cross-over points. One advantage of coupling a drift model with the equivalent source model is that the drift behaviour may be deduced from a larger number or essentially all the measurements in the survey.

Figure 4:
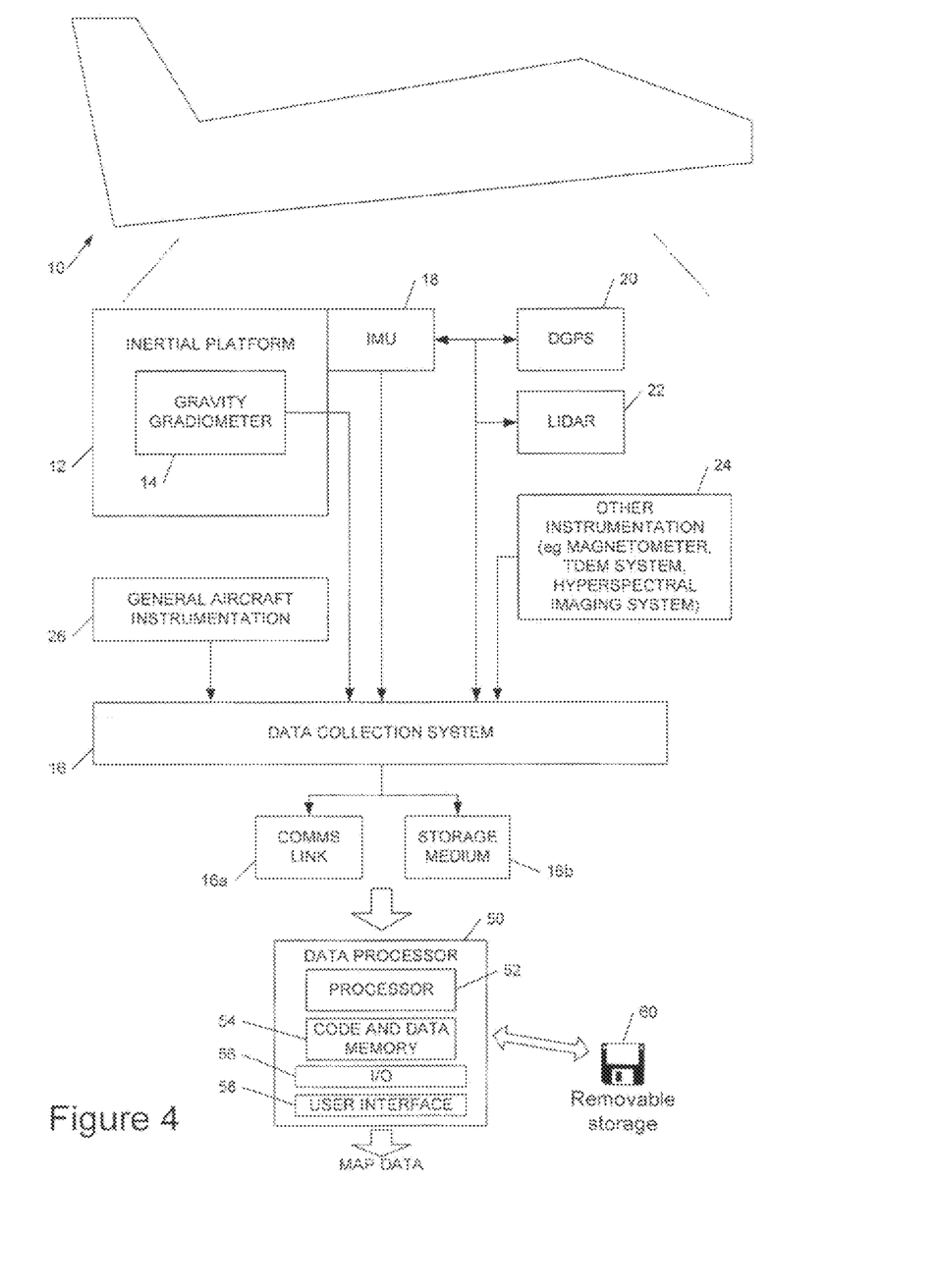
FIG. 4 shows an aircraft with flight survey data, and an example of a data processing system configured to implement an embodiment of a method according to the invention.

Referring now to FIG. 4, this shows an example of an aircraft 10 for conducting a potential field survey to obtain data for processing in accordance with a method as described above. The aircraft 10 comprises an inertial platform 12 on which is mounted a gravity gradiometer 14 (and/or vector magnetometer) which provides potential field survey data to a data collection system 16. The inertial platform 12 is fitted with an inertial measurement unit (IMU) 18 which also provides data to data collection system 16 typically comprising attitude data (for example, pitch, roll and yaw data), angular rate and angular acceleration data, and aircraft acceleration data. The aircraft is also equipped with a differential GPS system 20 and a LIDAR system 22 or similar to provide data on the height of the aircraft above the underlying terrain. Position and time data are preferably obtained from (D)GPS, optionally in combination with the IMU for accuracy.

The aircraft 10 may also be equipped with other instrumentation 24 such as a magnetometer, a TDEM (Time Domain Electromagnetic System) system and/or a hyperspectral imaging system, again feeding into the data collection system. The data collection system 16 also has an input from general aircraft instrumentation 26 which may comprise, for example, an altimeter, air and/or ground speed data and the like. The data collection system 16 may provide some initial data pre-processing, for example to correct the LIDAR data for aircraft motion and/or to combine data from the IMU 18 and DGPS 20. The data collection system 16 may be provided with a communications link 16a and/or non-volatile storage 16b to enable the collected potential field and position data to be stored for later processing. A network interface (not shown) may also be provided.

Data processing to generate map data for the potential field survey is generally (but not necessarily) carried out offline, sometimes in a different country to that where the survey data was collected. As illustrated a data processing system 50 comprises a processor 52 coupled to code and data memory 54, an input/output system 56 (for example comprising interfaces for a network and/or storage media and/or other communications), and to a user interface 58 for example comprising a keyboard and/or mouse. The code and/or data stored in memory 54 may be provided on a removable storage medium 60. In operation the data includes data collected from the potential field survey and the code comprises code to process this data to generate map data, in embodiments in accordance with the procedure shown in FIG. 5, described below.

Figure 5:
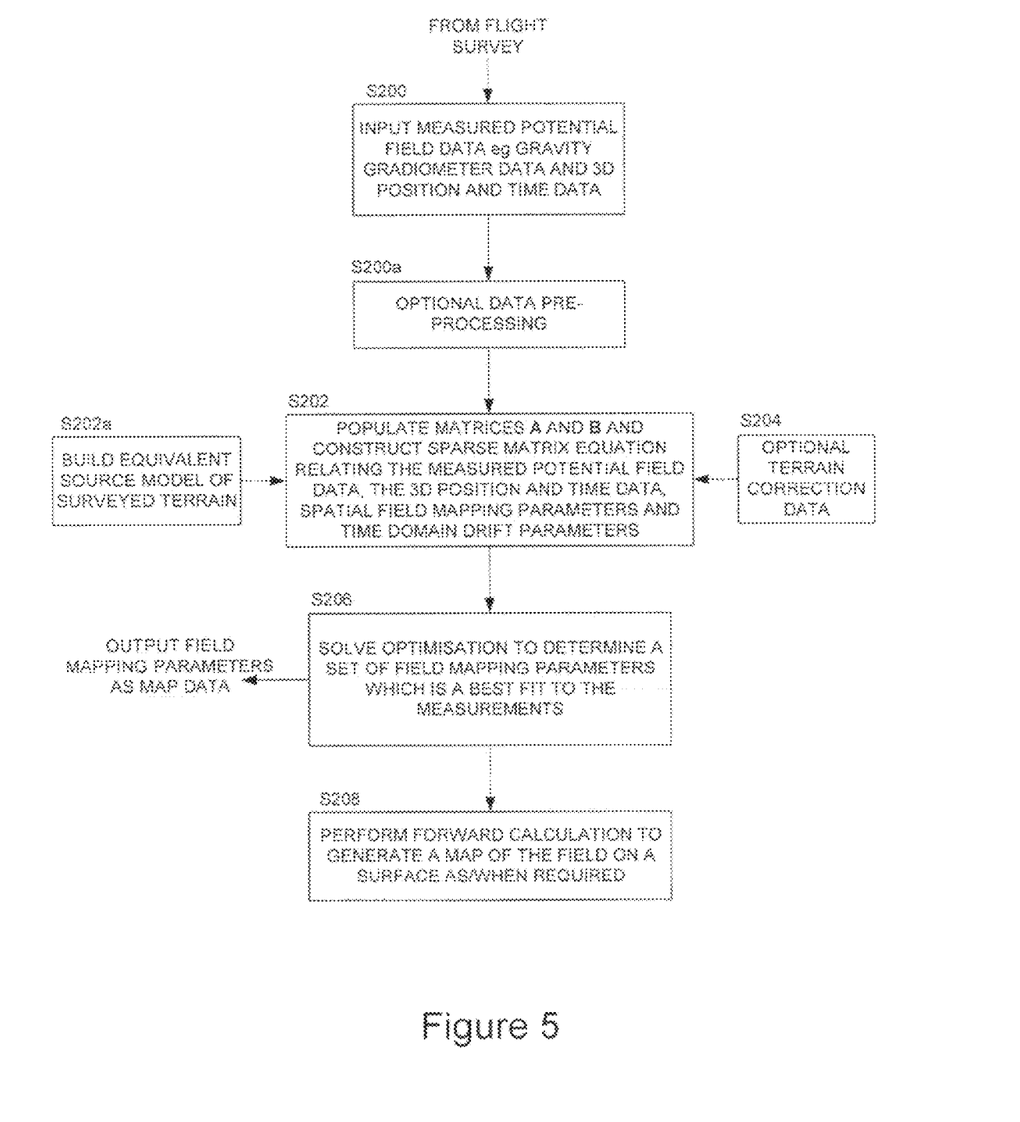
FIG. 5 shows a flow diagram of a procedure for processing measured potential field data to implement an embodiment of a method according to the invention.

Referring now to FIG. 5 this shows an example of a procedure for implementing on a data processor which may, in embodiments, comprise a general purpose computer system, for processing data from a flight survey in accordance with the previously described techniques. Thus, at step S200 the procedure inputs the measured potential field data, for example gravity gradiometer, and associated 3D position data. Optionally at step S200a, some pre-processing may be applied, for example to remove anomalies and/or to decrease (or increase) or select the data to be processed.

At step S202 the procedure populates matrices A and B as described above and then constructs a sparse matrix equation relating the measured potential field data, for example $G_{zz}$, the 3D measurement position and time data, spatial field mapping parameters ($\rho$) and time domain drift parameters ($\lambda$). An equivalent source model of the surveyed terrain (S202a) may be purpose built or a standard, regular grid may be employed. The procedure then solves the matrix equation (S206) to determine a set of field mapping parameters, more particularly a set of equivalent source element strengths, and these may provide an output from the procedure as map data. Alternatively a map may be explicitly calculated as part of the procedure (S208) by performing a forward calculation using these parameters. For example a two-dimensional map of the type shown in any of FIGS. 3a to 3c, or a three-dimensional map (more precisely a geological model) of the type shown in FIG. 2, may be constructed.

No doubt many other effective alternatives will occur to the skilled person. For example the technique we describe could be implemented in the Fourier domain, for example along the lines described in our co-pending PCT application ibid (PCT/GB2006/050211, incorporated by reference).

Although we have described the technique using the preferred example of an airborne potential field survey, embodiments may also be employed for marine potential field surveys conducted from a boat and, more generally, to potential field surveys conducted from other moving platforms or vehicles.

The techniques are not restricted to processing gravity data but may also be employed, for example, in processing magnetic field data. The measured potential field data may thus be obtained by measuring magnetic field and/or a flux density vector and/or its magnitude, for example using a measurement made with a magnetic gradiometer. The equivalent source elements may then have, for example, a surface current density or a pole strength.

It will be understood that the invention is not limited to the described embodiments and encompasses modifications apparent to those skilled in the art lying within the spirit and scope of the claims appended hereto.

The invention claimed is:

1. A computer-implemented method of processing measured potential field data from an airborne or marine potential field survey to determine a set of field mapping parameters for a model for mapping a field, the computer-implemented method comprising:
    inputting, into a processor, said measured potential field data from said airborne or marine potential field survey, said measured potential field data comprising data defining a plurality of potential field measurements each with an associated measurement position and measurement time; and
    determining, using said processor, said set of field mapping parameters by fitting said model to said measured potential field data, said model comprising a combination of a spatial part representing a spatial variation of said potential field and a temporal part representing time domain noise in said measured potential field data.

2. A computer-implemented method as claimed in claim 1 wherein said model is expressed as an equation comprising spatial and temporal terms, and wherein said determining comprises jointly determining estimates of said spatial and temporal terms to determine said field mapping parameters.

3. A computer-implemented method as claimed in claim 1 wherein said model has the form:

$$f(x,y,z,t) = A\rho(x,y,z) + B\lambda(t)$$

where $\rho$ and $\lambda$ are vectors of spatial and temporal model parameters respectively, A and B are matrices, and f comprises a forward calculation vector of measurements estimated from the model.

4. A computer-implemented method as claimed in claim 1 wherein said spatial part of said model comprises an equivalent source model.

5. A computer-implemented method as claimed in claim 1 wherein said temporal part of said model comprises an interpolation function to interpolate between nodal points at time intervals of greater than 60 seconds.

6. A computer-implemented method as claimed in claim 1 wherein said temporal part of said model comprises a piecewise linear model.

7. A computer-implemented method as claimed in claim wherein said time domain noise comprises measurement drift.

8. A computer-implemented method as claimed in claim 1 wherein said determining comprises minimising a measure of a difference between said measured potential field data and data predicted by said set of field mapping parameters to determine said set of field mapping parameters.

9. A computer-implemented method as claimed in claim 1 wherein said determining comprises regularising said spatial part and said temporal part of said model.

10. A computer-implemented method as claimed in claim 9 further comprising employing a gradient regularisation for said spatial part of said model.

11. A computer-implemented method as clamed in claim 9 comprising employing a Tikhonov regularisation for said temporal part of said model.

12. A computer-implemented method as claimed in claim 1 wherein said determining comprises regularising said spatial part of said model with a first regularisation and regularising said temporal part of said model with a second, different regularisation.

13. A computer-implemented method as claimed in claim 1 wherein said measured potential field data comprises measurements from a plurality of different survey lines of said airborne or marine potential field survey and wherein said method comprises jointly fitting said model to said measurements from said plurality of different survey lines.

14. A computer-implemented method as claimed in claim 1 wherein said measured potential field data comprises one or more of gravimeter data and gravity gradiometer data.

15. A computer-implemented method as claimed in claim 1 wherein said set of field mapping parameters comprise values for magnetic equivalent source elements.

16. A computer-implemented method as claimed in claim 1 wherein said set of field mapping parameters comprise values for equivalent source mass elements.

17. A computer-implemented method as claimed in claim 1 wherein said measured potential field data comprises data from a plurality of potential field measurement sources, wherein said spatial part of said model is common to said plurality of potential field measurement sources, and wherein a separate said temporal part of said model is provided for each said potential field measurement source.

18. A computer-implemented method as claimed in claim 1 further comprising determining a map using said set of field mapping parameters.

19. A non-transitory computer readable medium comprising processor control code which when executed on a processor causes the processor to process measured potential field data from an airborne or marine potential field survey to determine a set of field mapping parameters for a model for mapping a field by performing the operations of:
    inputting said measured potential field data from said airborne or marine potential field survey, said measured potential field data comprising data defining a plurality of potential field measurements each with an associated measurement position and measurement time; and
    determining said set of field mapping parameters by fitting said model to said measured potential field data, said model comprising a combination of a spatial part representing a spatial variation of said potential field and a temporal part representing time domain noise in said measured potential field data.

20. A data processing system for processing measured potential field data from a potential field survey to determine a set of field mapping parameters for a model for mapping a field, the system comprising:
    a data memory for said measured potential field data, said measured potential field data comprising data defining a plurality of potential field measurements each with an associated measurement position and measurement time; and
    a program memory storing processor control code; and
    a processor coupled to said data memory and to said program memory, wherein said processor is configured to load and execute said processor control code, causing the processor to:
    input said measured potential field data; and
    determine said set of field mapping parameters by fitting said model to said measured potential field data, said model comprising a combination of a spatial part representing a spatial variation of said potential field and a temporal part representing time domain noise in said measured potential field data.

21. A computer-implemented equivalent source method of processing measured potential field data to determine field mapping data for a model in which a potential field is modelled as a combination of a space-domain signal and a time-domain noise component, the method comprising:
  measuring potential field data using an airborne or marine survey;
  determining, by a processor, a joint best fit of said measured potential field data to said modelled combination of a space-domain signal and a time-domain noise component to determine said field mapping data for said model.

22. A computer-implemented equivalent source method as claimed in claim 21 further comprising including one or both of a spatial regularisation and a temporal regularisation in said modelled combination of said space-domain signal and said time-domain noise.

23. A computer-implemented equivalent source method as claimed in claim 21 wherein said measured potential field data comprises gravity data.

24. A non-transitory computer readable medium comprising processor control code which when executed on a processor causes the processor to process measured potential field data to determine field mapping data for a model in which a potential field is modeled as a combination of a space-domain signal and a time-domain noise component by performing the operations of:
  measuring potential field data using an airborne or marine survey;
  determining a joint best fit of said measured potential field data to said modelled combination of a space-domain signal and a time-domain noise component to determine said field mapping data for said model.

* * * * *